UNITED STATES PATENT OFFICE.

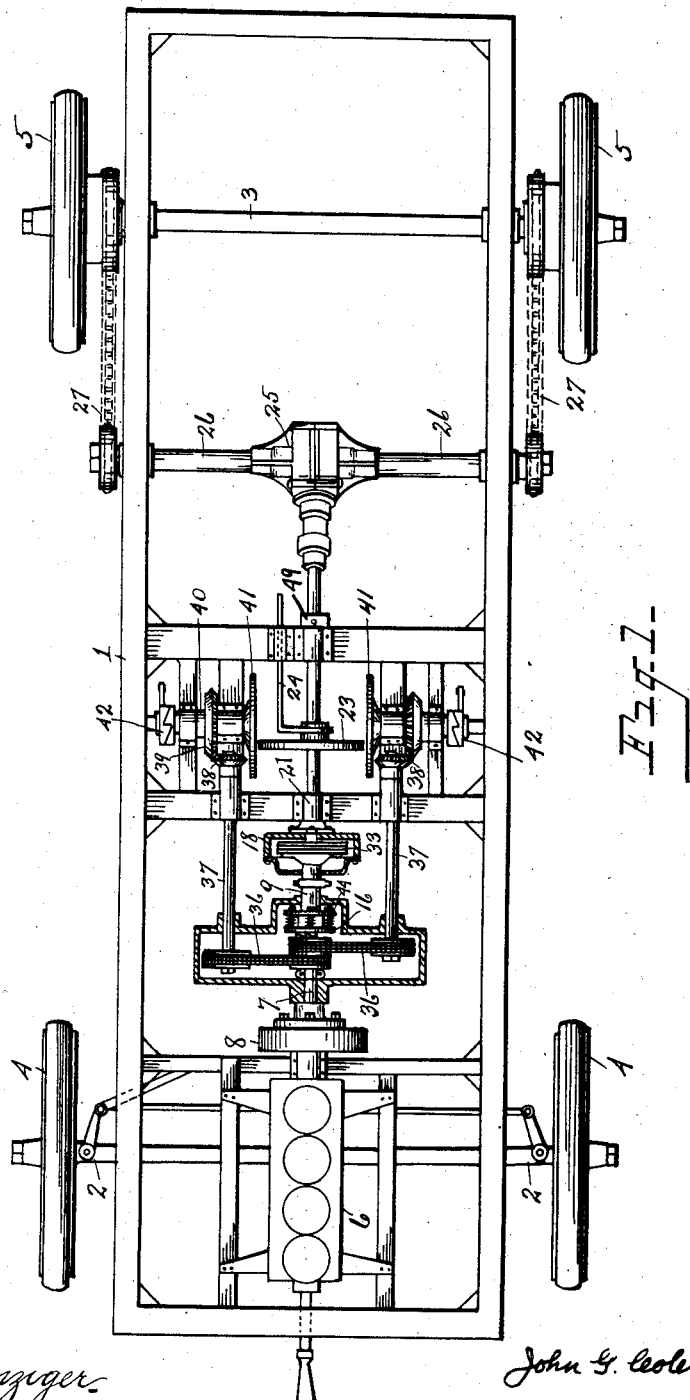

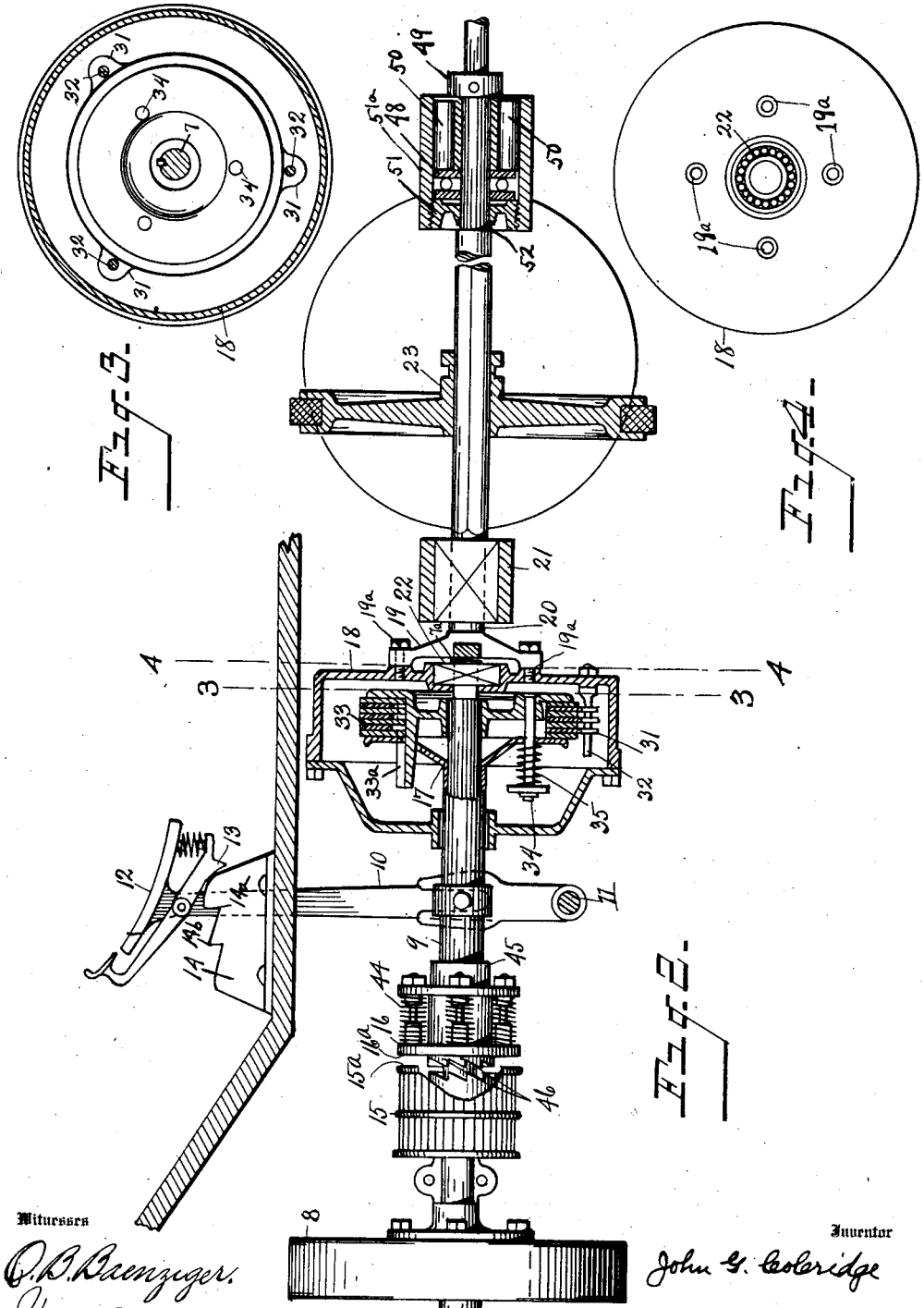

JOHN G. COLERIDGE, OF DETROIT, MICHIGAN, ASSIGNOR TO COLERIDGE COMMERCIAL CAR COMPANY, OF DETROIT, MICHIGAN, A CORPORATION OF MICHIGAN.

TRANSMISSION MECHANISM.

1,037,869.      Specification of Letters Patent.     Patented Sept. 10, 1912.

Application filed March 30, 1911. Serial No. 617,898.

*To all whom it may concern:*

Be it known that I, JOHN G. COLERIDGE, who am a subject of the King of Great Britain and Ireland, residing at Detroit, county of Wayne, State of Michigan, have invented a certain new and useful Improvement in Transmission Mechanism, and declare the following to be a full, clear, and exact description of the same, such as will enable others skilled in the art to which it pertains to make and use the same, reference being had to the accompanying drawings, which form a part of this specification.

This invention relates to transmission gearing, and has for its object an improved device whereby changes in speed may be effected by the selective use of either the high speed or low speed clutch members, with minimum requirement as to the levers necessary to handle to effect the same.

In the drawings:—Figure 1, is a plan view of the chassis of the vehicle, with the body thereof removed so as to show the machine parts. Fig. 2, is a side elevation, partly in section, of the part of the mechanism containing my improvements, and on a somewhat larger scale than Fig. 1. Fig. 3, is an end elevation of one of the clutches along the line 3—3 of Fig. 2. Fig. 4, is a similar elevation along the lines 4—4 of Fig. 2.

1 indicates the chassis of the vehicle, which rests, through the medium of the forward axle 2 and rear axle 3, upon the traction wheels 4 and 5. At the forward end of the vehicle is located the engine 6, from which extends rearwardly the power shaft 7, upon which is mounted the fly wheel 8. Over the power shaft 7 extends a sleeve 9 which is slidable along a limited path of travel thereover, being keyed thereto. The actuating yoke-lever 10 is pivoted at 11 with the control foot pedal member 12 adapted to engage with its pivot dog 13 in the ratchet 14, its position being dependent upon whether the vehicle is at standstill, or working upon its friction drive, or working upon its direct drive. When the dog 13 is in the position shown in Fig. 2, the parts of the direct drive 11 or high speed clutch are in operative engagement; when the dog 13 is in the notch 14$^a$, both clutches are out of engagement; when the dog 13 is in the notch 14$^b$, the friction drive parts are in engagement.

Rotatably mounted on the power shaft 7, and held from movement lengthwise thereof is a power-transmission drum or gear member 15, which with the complementary clutch member 16 engages, constituting a clutch preferably of the type particularly described in my copending application for patent Serial No. 616,344 filed March 23, 1911, this member 16 being mounted on the sleeve 9. At the rear and on the sleeve 9 is mounted one part 17 of a multiple-disk clutch, whose complementary member 18 extends thereabout, being mounted on the spider 19, which is carried on the forward end of the driven shaft 20, which is axially in alinement with the power shaft 7, and whose forward portion is preferably journaled in the bearing 21. The rear end of the power shaft 7 is journaled in bearings 22 in the casing 18, which forms a part of the clutch member referred to. Mounted on the driven shaft 20 to rotate therewith is a friction wheel 23, this wheel being keyed thereon to permit of its movement lengthwise of the shaft to secure variations of speed when on the friction drive, being actuated by the link 24. This driven shaft 20 extends rearwardly to the bevel gear which is inclosed in the casing 25, on the power-transmitting axles 26, thence, through the medium of chains 27 the rotative movement of the driven shaft is communicated to the traction wheels 5.

The parts 17 and 18 of the friction clutch referred to are, as illustrated, of the well known multiple-disk type, wherein one set of disks 31 is supported upon pins 32 in alternating arrangement with the disks 33 which are carried upon the keys 33$^a$, these two sets of disks being normally and yieldingly held in compressed relation by the springs 35 on the studs 34. When this clutch is actuated by the movement of the sleeve 9 rearwardly along the power shaft 7, the disks come into such strong frictional contact as to transmit rotative movement to the casing 18, spider 19, and shaft 20. I desire it to be understood, however, that any other suitable type of clutch member may be employed, without departure from the proper scope of this invention.

The power-transmitting drum 15 may have one or more separate sprocket surfaces for the passage thereover of sprocket chains 36 to the corresponding number of shafts 37, which are arranged in parallel relation to the power shaft 7, each shaft 37 being connected by bevel gears 38 and 39 with the stems 40 of the friction disks 41, which are adapted to engage the periphery of the friction wheel 23 on the driven shaft 20. The disks are adapted to be moved into operative relation with the periphery of the friction wheel 23 by a cam 42 or other suitable means which actuates them lengthwise of the stem 40. I desire, however, to be understood that in place of chains 36, the power-transmission drum 15 may be connected with either shaft 37 by gear wheels, instead of the chain. To provide for the actuation of this power-transmitting drum 15, the complementary clutch member 16 is keyed to rotate with the power shaft 7, though, being mounted in the sleeve 9, it is capable of lengthwise movement therealong. This clutch member may be moved toward the drum 15 until their friction faces 15$^a$ and 16$^a$ come into engagement, when, as described in my application above referred to, the frictional engagement between these parts will cause the drum 15 to begin to rotate slowly, although with considerable lost motion, relatively to the part 16. Continued pressure upon the lever 10, and consequently upon the part 16, causes a yielding of its springs 44, so that the interior, more centrally located, part 45 is projected with respect to the friction ring 16$^a$, whose forward movement is of course halted by the pressure of the drum 15. This permits the clutch teeth 46 of the drum 15 to penetrate sufficiently far toward the now projected and correspondingly shaped face of the clutch 16 as to cause an interlocking of these teeth, which thenceforth operatively unites the drum 15 with the clutch member 16, which is keyed to rotate with the shaft 7, and consequently gives the rotative effect thereof to accomplish the rotation of the friction disks 41, this being accomplished without the jar that would ordinarily accompany the bringing into interlocking engagement of two toothed shafts, one rotating and the other still. Of course when the operator's foot pressure upon the pedal 12 ceases, or when the engagement of the dog 13 and the ratchet 14 is ended, the action of the springs 44, and of the springs 35 as well, pulling upon the sleeve 9 and all the parts which it carries, forces the parts 15 and 16 apart, thus terminating their connection, and contemporaneously drawing the parts 17 and 18 of the other clutch into engagement, as heretofore described.

When the dog 13 rests in the notch 14$^a$ or 14$^b$, the thrust created by the springs in the two different clutch members is taken up on the nut 51 and casing 51$^a$, to which it is communicated by means of the screw 7$^a$ in the end of the shaft 7, the annular bearing 22, the spider 19 and the driven shaft 20, the collar 49, the roller bearings 50 and the thrust bearings 48, thus relieving the power shaft 7 from the strain that otherwise under such circumstances would be communicated to it. When the clutch members 17 and 18 are thrown into engagement, the rearward thrust created by the springs 35 on the stud 34 is taken up on the nut 51 and shoulder 52 on the driven shaft 20.

What I claim is:

1. In a transmission mechanism, the combination of a power shaft, a pair of clutch members, fixed to rotate therewith, a driven shaft axially in alinement with said power shaft, a clutch member carried by said driven shaft in position to be engaged by one of the clutch members on the power shaft, a pair of driven shafts in parallel relation to said power shaft, a power-transmitting member rotatably carried on said power shaft and operatively connected with said pair of driven shafts, a friction wheel carried on said first mentioned driven shaft, friction disks adapted to be thrown into operative engagement with said friction wheel and deriving their actuation from said pair of driven shafts, and means for throwing one of said clutch members on the power shaft into engagement with said power-transmitting member contemporaneously with the release of the other clutch member on the power shaft from engagement with the clutch member carried on that driven shaft which is axially in alinement with the power shaft substantially as described.

2. In a transmission mechanism, in combination with a power shaft, a pair of driven shafts, one in axial alinement therewith and the other in parallel relation thereto, a power-transmitting member rotatably carried on said power shaft, means operatively connecting said power-transmitting member with the second one of said driven shafts, a friction disk deriving its actuation from said second driven shaft, a friction wheel carried by the first of said driven shafts, against which said friction disk is adapted to be operatively forced, a clutch member carried by said first named driven shaft adjacent the end of the power shaft, a pair of clutch members carried on said power shaft and rotatable therewith, and means for forcing one of said clutch members on the power shaft into operative engagement with the power-transmitting member thereon contemporaneously with the ending of the operative engagement between the other clutch member on the power shaft and the clutch member on the first driven shaft and vice versa, substantially as described.

3. In a transmission mechanism, in combination with a power shaft, a driven shaft axially in alinement therewith, a pair of driven shafts in parallel relation therewith, a friction wheel keyed to rotate with the driven shaft, a thrust bearing in which said first named driven shaft is journaled, adapted to relieve the strain on the power shaft when the two shafts are out of operative connection, a clutch member carried on said first named driven shaft adjacent the end of the power shaft, a pair of clutch members keyed to rotate with said power shaft, one being adapted to engage the clutch member on said first named driven shaft, a power-transmitting member having an operative connection with said driven shafts which are in parallel relation to said power shaft, rotatably mounted on said power shaft, means for throwing that one of the clutch members which is adapted to engage the clutch member on the first named driven shaft into engagement therewith contemporaneously with the termination of the operative engagement between the other of the clutch members on the power shaft and said power-transmitting member, friction disks adapted to receive their actuation from said second named driven shafts, and means for forcing said disks into operative engagement with the periphery of said friction wheel substantially as described.

In testimony whereof, I sign this specification in the presence of two witnesses.

JOHN G. COLERIDGE.

Witnesses:
  VIRGINIA C. SPRATT,
  WILLIAM M. SWAN.

Copies of this patent may be obtained for five cents each, by addressing the "Commissioner of Patents, Washington, D. C."